(12) United States Patent
Hazra et al.

(10) Patent No.: US 10,522,106 B2
(45) Date of Patent: Dec. 31, 2019

(54) METHODS AND APPARATUS FOR ACTIVE TRANSPARENCY MODULATION

(71) Applicant: Ostendo Technologies, Inc., Carlsbad, CA (US)

(72) Inventors: Siddharth S. Hazra, Carlsbad, CA (US); Hussein S. El-Ghoroury, Carlsbad, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 0 days.

(21) Appl. No.: 15/587,260

(22) Filed: May 4, 2017

(65) Prior Publication Data

US 2017/0323615 A1 Nov. 9, 2017

Related U.S. Application Data

(60) Provisional application No. 62/332,168, filed on May 5, 2016.

(51) Int. Cl.
*G09G 3/38* (2006.01)
*G09G 5/10* (2006.01)
(Continued)

(52) U.S. Cl.
CPC ........... *G09G 3/38* (2013.01); *G02B 27/0172* (2013.01); *G06F 3/147* (2013.01); *G06T 1/20* (2013.01);
(Continued)

(58) Field of Classification Search
CPC combination set(s) only.
See application file for complete search history.

(56) References Cited

U.S. PATENT DOCUMENTS

| 4,427,912 A | 1/1984 | Bui et al. |
| 4,987,410 A | 1/1991 | Berman et al. |

(Continued)

FOREIGN PATENT DOCUMENTS

| CN | 103298410 | 9/2013 |
| CN | 103546181 | 1/2014 |

(Continued)

OTHER PUBLICATIONS

"International Search Report and Written Opinion of the International Searching Authority dated Aug. 23, 2017; International Application No. PCT/US2017/031441", dated Aug. 23, 2017.

(Continued)

*Primary Examiner* — Wesner Sajous
(74) *Attorney, Agent, or Firm* — Womble Bond Dickinson (US) LLP (57) ABSTRACT

A viewing system is provided including an active transparency modulation film in the form of addressable arrays of electrochromic pixel structures. The viewing system may be used in, for instance, a head-mounted display (HMD) or head-up display (HUD). The film is located on one side of a viewing lens of the system and is selectively variable from opaque to transparent at certain regions on the lens to provide an opaque silhouetted image upon which a virtual image is projected. The viewing system including the film and pixel structure therefore provide improved viewing by minimizing the undesirable effects of image ghosting in a viewed scene.

9 Claims, 9 Drawing Sheets

(51) Int. Cl.
  *G06T 1/20* (2006.01)
  *G06T 11/60* (2006.01)
  *G02B 27/01* (2006.01)
  *G02F 1/153* (2006.01)
  *G06F 3/147* (2006.01)
  *G09G 3/00* (2006.01)

(52) U.S. Cl.
  CPC .............. *G06T 11/60* (2013.01); *G09G 3/002* (2013.01); *G02B 2027/014* (2013.01); *G02B 2027/0118* (2013.01); *G02B 2027/0178* (2013.01); *G09G 2320/0257* (2013.01); *G09G 2320/064* (2013.01); *G09G 2340/12* (2013.01); *G09G 2360/08* (2013.01); *G09G 2360/144* (2013.01)

(56) References Cited

U.S. PATENT DOCUMENTS

| | | |
|---|---|---|
| 5,162,828 A | 11/1992 | Furness et al. |
| 5,368,042 A | 11/1994 | O'Neal et al. |
| 5,619,373 A | 4/1997 | Meyerhofer et al. |
| 5,696,521 A | 12/1997 | Robinson et al. |
| 5,818,359 A | 10/1998 | Beach |
| 5,886,822 A | 3/1999 | Spitzer |
| 5,986,811 A | 11/1999 | Wohlstadter |
| 6,128,003 A | 10/2000 | Smith et al. |
| 6,147,807 A | 11/2000 | Droessler et al. |
| 6,151,167 A | 11/2000 | Melville |
| 6,353,503 B1 | 3/2002 | Spitzer et al. |
| 6,433,907 B1 | 8/2002 | Lippert et al. |
| 6,456,438 B1 | 9/2002 | Lee et al. |
| 6,522,794 B1 | 2/2003 | Bischel et al. |
| 6,529,331 B2 | 3/2003 | Massof et al. |
| 6,666,825 B2 | 12/2003 | Smith et al. |
| 6,710,902 B2 | 3/2004 | Takeyama |
| 6,719,693 B2 | 4/2004 | Richard |
| 6,795,221 B1 | 9/2004 | Urey |
| 6,803,561 B2 | 10/2004 | Dunfield |
| 6,804,066 B1 | 10/2004 | Ha et al. |
| 6,829,095 B2 * | 12/2004 | Amitai .................. G02B 6/0018 359/629 |
| 6,924,476 B2 | 8/2005 | Wine et al. |
| 6,937,221 B2 | 8/2005 | Lippert et al. |
| 6,984,208 B2 | 1/2006 | Zheng |
| 6,999,238 B2 | 2/2006 | Glebov et al. |
| 7,061,450 B2 | 6/2006 | Bright et al. |
| 7,071,594 B1 | 7/2006 | Yan et al. |
| 7,106,519 B2 | 9/2006 | Aizenberg et al. |
| 7,190,329 B2 | 3/2007 | Lewis et al. |
| 7,193,758 B2 | 3/2007 | Wiklof et al. |
| 7,209,271 B2 | 4/2007 | Lewis et al. |
| 7,215,475 B2 | 5/2007 | Woodgate et al. |
| 7,232,071 B2 | 6/2007 | Lewis et al. |
| 7,369,321 B1 | 5/2008 | Ren et al. |
| 7,482,730 B2 | 1/2009 | Davis et al. |
| 7,486,255 B2 | 2/2009 | Brown et al. |
| 7,545,571 B2 * | 6/2009 | Garoutte ............ G02B 27/0172 345/7 |
| 7,580,007 B2 | 8/2009 | Brown et al. |
| 7,619,807 B2 | 11/2009 | Baek et al. |
| 7,623,560 B2 | 11/2009 | El-Ghoroury et al. |
| 7,724,210 B2 | 5/2010 | Sprague et al. |
| 7,747,301 B2 | 6/2010 | Cheng et al. |
| 7,767,479 B2 | 8/2010 | El-Ghoroury et al. |
| 7,791,810 B2 | 9/2010 | Powell |
| 7,829,902 B2 | 11/2010 | El-Ghoroury et al. |
| 7,952,809 B2 | 5/2011 | Takai |
| 8,049,231 B2 | 11/2011 | El-Ghoroury et al. |
| 8,098,265 B2 | 1/2012 | El-Ghoroury et al. |
| 8,243,770 B2 | 8/2012 | El-Ghoroury et al. |
| 8,279,716 B1 | 10/2012 | Gossweiler, III et al. |
| 8,292,833 B2 | 10/2012 | Son et al. |
| 8,405,618 B2 | 3/2013 | Colgate et al. |
| 8,471,967 B2 | 6/2013 | Miao et al. |
| 8,477,425 B2 | 7/2013 | Border et al. |
| 8,482,859 B2 | 7/2013 | Border |
| 8,508,830 B1 * | 8/2013 | Wang .................. G02B 3/0006 359/267 |
| 8,508,851 B2 | 8/2013 | Miao et al. |
| 8,510,244 B2 | 8/2013 | Carson et al. |
| 8,553,910 B1 | 10/2013 | Dong et al. |
| 8,567,960 B2 | 10/2013 | El-Ghoroury et al. |
| 8,619,049 B2 | 12/2013 | Harrison et al. |
| 8,725,842 B1 | 5/2014 | Al-Nasser |
| 8,743,145 B1 | 6/2014 | Price |
| 8,773,599 B2 | 7/2014 | Saeedi et al. |
| 8,854,724 B2 | 10/2014 | El-Ghoroury et al. |
| 8,928,969 B2 | 1/2015 | Alpaslan et al. |
| 8,975,713 B2 | 3/2015 | Sako et al. |
| 9,097,890 B2 | 8/2015 | Miller et al. |
| 9,110,504 B2 | 8/2015 | Lewis et al. |
| 9,134,535 B2 | 9/2015 | Dobschal et al. |
| 9,179,126 B2 | 11/2015 | El-Ghoroury et al. |
| 9,239,453 B2 | 1/2016 | Cheng et al. |
| 9,244,277 B2 | 1/2016 | Cheng et al. |
| 9,244,539 B2 | 1/2016 | Venable et al. |
| 9,274,608 B2 | 3/2016 | Katz et al. |
| 9,286,730 B2 | 3/2016 | Bar-Zeev et al. |
| 9,529,191 B2 | 12/2016 | Sverdrup et al. |
| 9,538,182 B2 | 1/2017 | Mishourovsky et al. |
| 9,681,069 B2 | 6/2017 | El-Ghoroury et al. |
| 9,712,764 B2 | 7/2017 | El-Ghoroury et al. |
| 9,774,800 B2 | 9/2017 | El-Ghoroury et al. |
| 9,779,515 B2 | 10/2017 | El-Ghoroury et al. |
| 9,965,982 B2 | 5/2018 | Lapstun |
| 2002/0008854 A1 | 1/2002 | Leigh Travis |
| 2002/0017567 A1 | 2/2002 | Connolly et al. |
| 2002/0024495 A1 | 2/2002 | Lippert et al. |
| 2002/0075232 A1 | 6/2002 | Daum et al. |
| 2002/0083164 A1 | 6/2002 | Katayama et al. |
| 2002/0141026 A1 | 10/2002 | Wiklof et al. |
| 2002/0158814 A1 | 10/2002 | Bright et al. |
| 2002/0181115 A1 | 12/2002 | Massof et al. |
| 2002/0194005 A1 | 12/2002 | Lahr |
| 2003/0032884 A1 | 2/2003 | Smith et al. |
| 2003/0086135 A1 | 5/2003 | Takeyama |
| 2003/0122066 A1 | 7/2003 | Dunfield |
| 2003/0138130 A1 | 7/2003 | Cohen et al. |
| 2003/0184575 A1 | 10/2003 | Reho et al. |
| 2003/0187357 A1 | 10/2003 | Richard |
| 2004/0004585 A1 | 1/2004 | Brown et al. |
| 2004/0024312 A1 | 2/2004 | Zheng |
| 2004/0051392 A1 | 3/2004 | Badarneh |
| 2004/0080807 A1 | 4/2004 | Chen et al. |
| 2004/0080938 A1 | 4/2004 | Holman et al. |
| 2004/0085261 A1 | 5/2004 | Lewis et al. |
| 2004/0119004 A1 | 6/2004 | Wine et al. |
| 2004/0125076 A1 | 7/2004 | Green |
| 2004/0138935 A1 | 7/2004 | Johnson et al. |
| 2004/0179254 A1 | 9/2004 | Lewis et al. |
| 2004/0240064 A1 | 12/2004 | Dutta |
| 2005/0002074 A1 | 1/2005 | McPheters et al. |
| 2005/0024730 A1 | 2/2005 | Aizenberg et al. |
| 2005/0053192 A1 | 3/2005 | Sukovic et al. |
| 2005/0116038 A1 | 6/2005 | Lewis et al. |
| 2005/0117195 A1 | 6/2005 | Glebov et al. |
| 2005/0168700 A1 | 8/2005 | Berg et al. |
| 2005/0179976 A1 | 8/2005 | Davis et al. |
| 2005/0264502 A1 | 12/2005 | Sprague et al. |
| 2006/0017655 A1 | 1/2006 | Brown et al. |
| 2006/0132383 A1 | 6/2006 | Gally et al. |
| 2006/0152812 A1 | 7/2006 | Woodgate et al. |
| 2006/0253007 A1 | 11/2006 | Cheng et al. |
| 2006/0285192 A1 | 12/2006 | Yang |
| 2006/0290663 A1 | 12/2006 | Mitchell |
| 2007/0052694 A1 | 3/2007 | Holmes |
| 2007/0083120 A1 | 4/2007 | Cain et al. |
| 2007/0236450 A1 | 10/2007 | Colgate et al. |
| 2007/0269432 A1 | 11/2007 | Nakamura et al. |
| 2007/0276658 A1 | 11/2007 | Douglass |
| 2008/0002262 A1 | 1/2008 | Chirieleison |
| 2008/0049291 A1 | 2/2008 | Baek et al. |

(56) References Cited

U.S. PATENT DOCUMENTS

| | | |
|---|---|---|
| 2008/0130069 A1* | 6/2008 | Cernasov .............. H04N 1/0316 358/487 |
| 2008/0141316 A1 | 6/2008 | Igoe et al. |
| 2008/0239452 A1 | 10/2008 | Xu et al. |
| 2009/0073559 A1 | 3/2009 | Woodgate et al. |
| 2009/0086170 A1 | 4/2009 | El-Ghoroury et al. |
| 2009/0096746 A1 | 4/2009 | Kruse et al. |
| 2009/0161191 A1 | 6/2009 | Powell |
| 2009/0199900 A1 | 8/2009 | Bita et al. |
| 2009/0222113 A1 | 9/2009 | Fuller et al. |
| 2009/0256287 A1 | 10/2009 | Fu et al. |
| 2009/0268303 A1 | 10/2009 | Takai |
| 2009/0278998 A1 | 11/2009 | El-Ghoroury et al. |
| 2009/0327171 A1 | 12/2009 | Tan et al. |
| 2010/0003777 A1 | 1/2010 | El-Ghoroury et al. |
| 2010/0026960 A1 | 2/2010 | Sprague |
| 2010/0046070 A1 | 2/2010 | Mukawa |
| 2010/0053164 A1 | 3/2010 | Imai et al. |
| 2010/0066921 A1 | 3/2010 | El-Ghoroury et al. |
| 2010/0091050 A1 | 4/2010 | El-Ghoroury et al. |
| 2010/0156676 A1 | 6/2010 | Mooring et al. |
| 2010/0171922 A1 | 7/2010 | Sessner et al. |
| 2010/0199232 A1 | 8/2010 | Mistry et al. |
| 2010/0220042 A1 | 9/2010 | El-Ghoroury et al. |
| 2010/0241601 A1 | 9/2010 | Carson et al. |
| 2010/0245957 A1 | 9/2010 | Hudman et al. |
| 2010/0259472 A1 | 10/2010 | Radivojevic et al. |
| 2010/0267449 A1 | 10/2010 | Gagner et al. |
| 2011/0054360 A1 | 3/2011 | Son et al. |
| 2011/0115887 A1 | 5/2011 | Yoo et al. |
| 2011/0221659 A1 | 9/2011 | King, III et al. |
| 2011/0285666 A1 | 11/2011 | Poupyrev et al. |
| 2011/0285667 A1 | 11/2011 | Poupyrev et al. |
| 2012/0033113 A1 | 2/2012 | El-Ghoroury et al. |
| 2012/0075173 A1 | 3/2012 | Ashbrook et al. |
| 2012/0075196 A1 | 3/2012 | Ashbrook et al. |
| 2012/0105310 A1 | 5/2012 | Sverdrup et al. |
| 2012/0113097 A1 | 5/2012 | Nam et al. |
| 2012/0120498 A1 | 5/2012 | Harrison et al. |
| 2012/0143358 A1 | 6/2012 | Adams et al. |
| 2012/0154441 A1 | 6/2012 | Kim |
| 2012/0157203 A1 | 6/2012 | Latta et al. |
| 2012/0195461 A1 | 8/2012 | Lawrence Ashok Inigo |
| 2012/0212398 A1 | 8/2012 | Border et al. |
| 2012/0212399 A1 | 8/2012 | Border et al. |
| 2012/0218301 A1* | 8/2012 | Miller .................. G02B 27/017 345/633 |
| 2012/0236201 A1 | 9/2012 | Larsen et al. |
| 2012/0249409 A1 | 10/2012 | Toney et al. |
| 2012/0249741 A1 | 10/2012 | Maciocci et al. |
| 2012/0288995 A1 | 11/2012 | El-Ghoroury et al. |
| 2012/0290943 A1 | 11/2012 | Toney et al. |
| 2012/0293402 A1 | 11/2012 | Harrison et al. |
| 2012/0299962 A1 | 11/2012 | White et al. |
| 2012/0319940 A1 | 12/2012 | Bress et al. |
| 2012/0320092 A1 | 12/2012 | Shin et al. |
| 2013/0016292 A1 | 1/2013 | Miao et al. |
| 2013/0021658 A1 | 1/2013 | Miao et al. |
| 2013/0027341 A1 | 1/2013 | Mastandrea |
| 2013/0041477 A1 | 2/2013 | Sikdar et al. |
| 2013/0050260 A1 | 2/2013 | Reitan |
| 2013/0080890 A1 | 3/2013 | Krishnamurthi |
| 2013/0083303 A1 | 4/2013 | Hoover et al. |
| 2013/0100362 A1 | 4/2013 | Saeedi et al. |
| 2013/0141895 A1 | 6/2013 | Alpaslan et al. |
| 2013/0162505 A1 | 6/2013 | Crocco et al. |
| 2013/0169536 A1 | 7/2013 | Wexler et al. |
| 2013/0176622 A1 | 7/2013 | Abrahamsson et al. |
| 2013/0187836 A1 | 7/2013 | Cheng et al. |
| 2013/0196757 A1 | 8/2013 | Latta et al. |
| 2013/0215516 A1 | 8/2013 | Dobschal et al. |
| 2013/0225999 A1 | 8/2013 | Banjanin et al. |
| 2013/0258451 A1 | 10/2013 | El-Ghoroury et al. |
| 2013/0271679 A1* | 10/2013 | Sakamoto ......... G02F 1/133514 349/33 |
| 2013/0285174 A1 | 10/2013 | Sako et al. |
| 2013/0286053 A1 | 10/2013 | Fleck et al. |
| 2013/0286178 A1 | 10/2013 | Lewis et al. |
| 2013/0321581 A1 | 12/2013 | El-Ghoroury et al. |
| 2014/0009845 A1 | 1/2014 | Cheng et al. |
| 2014/0024132 A1 | 1/2014 | Jia et al. |
| 2014/0049417 A1 | 2/2014 | Abdurrahman et al. |
| 2014/0049983 A1 | 2/2014 | Nichol et al. |
| 2014/0055352 A1 | 2/2014 | David et al. |
| 2014/0055692 A1 | 2/2014 | Kroll et al. |
| 2014/0085177 A1 | 3/2014 | Lyons et al. |
| 2014/0091984 A1 | 4/2014 | Ashbrook et al. |
| 2014/0098018 A1 | 4/2014 | Kim et al. |
| 2014/0098067 A1 | 4/2014 | Yang et al. |
| 2014/0118252 A1 | 5/2014 | Kim et al. |
| 2014/0129207 A1 | 5/2014 | Bailey et al. |
| 2014/0139454 A1 | 5/2014 | Mistry et al. |
| 2014/0139576 A1 | 5/2014 | Costa et al. |
| 2014/0147035 A1 | 5/2014 | Ding et al. |
| 2014/0168062 A1 | 6/2014 | Katz et al. |
| 2014/0176417 A1 | 6/2014 | Young et al. |
| 2014/0185142 A1 | 7/2014 | Gupta et al. |
| 2014/0200496 A1 | 7/2014 | Hyde et al. |
| 2014/0232651 A1 | 8/2014 | Kress et al. |
| 2014/0292620 A1 | 10/2014 | Lapstun |
| 2014/0300869 A1 | 10/2014 | Hirsch et al. |
| 2014/0301662 A1 | 10/2014 | Justice et al. |
| 2014/0304646 A1 | 10/2014 | Rossmann |
| 2014/0340304 A1 | 11/2014 | Dewan et al. |
| 2015/0001987 A1 | 1/2015 | Masaki et al. |
| 2015/0033539 A1 | 2/2015 | El-Ghoroury et al. |
| 2015/0035832 A1 | 2/2015 | Sugden et al. |
| 2015/0054729 A1 | 2/2015 | Minnen et al. |
| 2015/0058102 A1 | 2/2015 | Christensen et al. |
| 2015/0125109 A1 | 5/2015 | Robbins et al. |
| 2015/0138086 A1 | 5/2015 | Underkoffler et al. |
| 2015/0148886 A1 | 5/2015 | Rao et al. |
| 2015/0193984 A1* | 7/2015 | Bar-Zeev .............. G02B 26/026 345/633 |
| 2015/0205126 A1 | 7/2015 | Schowengerdt |
| 2015/0220109 A1 | 8/2015 | von Badinski et al. |
| 2015/0235467 A1 | 8/2015 | Schowengerdt et al. |
| 2015/0277126 A1 | 10/2015 | Hirano et al. |
| 2015/0301256 A1* | 10/2015 | Takiguchi ............. G02B 21/365 359/9 |
| 2015/0301383 A1* | 10/2015 | Kimura ............... G02F 1/13454 349/12 |
| 2015/0323990 A1 | 11/2015 | Maltz |
| 2015/0323998 A1 | 11/2015 | Kudekar et al. |
| 2015/0326842 A1 | 11/2015 | Huai |
| 2015/0381782 A1 | 12/2015 | Park |
| 2016/0018948 A1 | 1/2016 | Parvarandeh et al. |
| 2016/0026059 A1 | 1/2016 | Chung et al. |
| 2016/0028935 A1 | 1/2016 | El-Ghoroury et al. |
| 2016/0116738 A1 | 4/2016 | Osterhout |
| 2016/0182782 A1 | 6/2016 | El-Ghoroury et al. |
| 2016/0191765 A1 | 6/2016 | El-Ghoroury et al. |
| 2016/0191823 A1 | 6/2016 | El-Ghoroury et al. |
| 2016/0220232 A1 | 8/2016 | Takada et al. |
| 2016/0342151 A1 | 11/2016 | Dey, IV et al. |
| 2017/0065872 A1 | 3/2017 | Kelley |
| 2017/0069134 A1 | 3/2017 | Shapira et al. |
| 2017/0116897 A1 | 4/2017 | Ahn et al. |
| 2017/0184776 A1 | 6/2017 | El-Ghoroury et al. |
| 2017/0236295 A1 | 8/2017 | El-Ghoroury |
| 2017/0261388 A1 | 9/2017 | Ma et al. |
| 2017/0310956 A1* | 10/2017 | Perdices-Gonzalez ..................... H04N 13/366 |

FOREIGN PATENT DOCUMENTS

| | | |
|---|---|---|
| CN | 103558918 | 2/2014 |
| CN | 104460992 | 3/2015 |
| EP | 0431488 | 1/1996 |
| KR | 10-1552134 | 9/2015 |
| WO | WO-2014/124173 | 8/2014 |

OTHER PUBLICATIONS

(56) References Cited

OTHER PUBLICATIONS

"Invitation to Pay Additional Fees Dated Jun. 23, 2017; International Application No. PCT/US2017/031441", Jun. 23, 2017.
Ahumada, Jr., Albert J. et al., "Spatio-temporal discrimination model predicts temporal masking functions", Proceedings of SPIE—the International Society for Optical Engineering, Human vision and electronic imaging III, vol. 3299, 1998, 6 pp. total.
Beulen, Bart W. et al., "Toward Noninvasive Blood Pressure Assessment in Arteries by Using Ultrasound", Ultrasound in Medicine & Biology, vol. 37, No. 5, 2011, pp. 788-797.
Bickel, Bernd et al., "Capture and Modeling of Non-Linear Heterogeneous Soft Tissue", ACM Transactions on Graphics (TOG)—Proceedings of ACM SIGGRAPH 2009, vol. 28, Issue 3, Article No. 89, Aug. 2009, 9 pp. total.
Castellini, Claudio et al., "Using Ultrasound Images of the Forearm to Predict Finger Positions", IEEE Transactions on Neural Systems and Rehabilitation Engineering, vol. 20, No. 6, Nov. 2012, pp. 788-797.
Cobbold, Richard S., "Foundations of Biomedical Ultrasound", Oxford University Press, 2007, pp. 3-95.
Fattal, David et al., "A multi-directional backlight for a wide-angle, glasses-free three-dimensional display", Nature, vol. 495, Mar. 21, 2013, pp. 348-351.
Grossberg, Stephen et al., "Neural dynamics of saccadic and smooth pursuit eye movement coordination during visual tracking of unpredictably moving targets", Neural Networks, vol. 27, 2012, pp. 1-20.
Guo, Jing-Yi et al., "Dynamic monitoring of forearm muscles using one-dimensional sonomyography system", Journal of Rehabilitation Research & Development, vol. 45, No. 1, 2008, pp. 187-195.
Harrison, Chris et al., "Skinput: Appropriating the Body as an Input Surface", CHI '10 Proceedings of the SIGCHI Conference on Human Factors in Computing Systems, 2010, pp. 453-462.
Hsiao, Tzu-Yu et al., "Noninvasive Assessment of Laryngeal Phonation Function Using Color Doppler Ultrasound Imaging", Ultrasound in Med. & Biol., vol. 27, No. 8, 2001, pp. 1035-1040.
Hua, Hong et al., "A 3D integral imaging optical see-through head-mounted display", Optics Express, vol. 22, No. 11, May 28, 2014, pp. 13484-13491.
Keir, Peter J. et al., "Changes in geometry of the finger flexor tendons in the carpal tunnel with wrist posture and tendon load: an MRI study on normal wrists", Clinical Biomechanics, vol. 14, 1999, pp. 635-645.
Khuri-Yakub, Butrus T. et al., "Capacitive micromachined ultrasonic transducers for medical imaging and therapy", J. Micromech. Microeng., vol. 21, No. 5, May 2011, pp. 054004-054014.
Koutsouridis, G. G. et al., "Towards a Non-Invasive Ultrasound Pressure Assessment in Large Arteries", Technische Universiteit Eindhoven, University of Technology, Mate Poster Award 2010: 15th Annual Poster Contest, 2010, 1 page total.
Lanman, Douglas et al., "Near-Eye Light Field Displays", ACM Transactions on Graphics (TOC), vol. 32, Issue 6, Article 220, Nov. 2013, 27 pp. total.
Legros, M. et al., "Piezocomposite and CMUT Arrays Assessment Through In Vitro Imaging Performances", 2008 IEEE Ultrasonics Symposium, Nov. 2-5, 2008, pp. 1142-1145.
Martin, Joel R. et al., "Changes in the flexor digitorum profundus tendon geometry in the carpal tunnel due to force production and posture of metacarpophalangeal joint of the index finger: An MRI study", Clinical Biomechanics, vol. 28, 2013, pp. 157-163.
Martin, Joel R. et al., "Effects of the index finger position and force production on the flexor digitorum superficialis moment arms at the metacarpophalangeal joints—a magnetic resonance imaging study", Clinical Biomechanics, vol. 27, 2012, pp. 453-459.
Marwah, Kshitij et al., "Compressive Light Field Photography using Overcomplete Dictionaries and Optimized Projections", Proc. of SIGGRAPH 2013 (ACM Transactions on Graphics, 32, 4), 2013, 12 pp. total.
Mujibiya, Adiyan et al., "The Sound of Touch: On-body Touch and Gesture Sensing Based on Transdermal Ultrasound Propagation", ITS '13 Proceedings of the 2013 ACM international conference on Interactive tabletops and surfaces, Oct. 6-9, 2013, pp. 189-198.
Paclet, Florent et al., "Motor control theories improve biomechanical model of the hand for finger pressing tasks", Journal of Biomechanics, vol. 45, 2012, pp. 1246-1251.
Pinton, Gianmarco F. et al., "A Heterogeneous Nonlinear Attenuating Full-Wave Model of Ultrasound", IEEE Transactions on Ultrasonics, Ferroelectrics, and Frequency Control, vol. 56, No. 3, Mar. 2009, pp. 474-488.
Richard, William D. et al., "A scalable architecture for real-time synthetic-focus imaging", Ultrasonic Imaging, vol. 25, 2003, pp. 151-161.
Rolland, Jannick P. et al., "Dynamic focusing in head-mounted displays", Part of the IS&T/SPIE Conference on the Engineering Reality of Virtual Reality, SPIE vol. 3639, Jan. 1999, pp. 463-470.
Shi, Jun et al., "Feasibility of controlling prosthetic hand using sonomyography signal in real time: Preliminary study", Journal of Rehabilitation Research & Development, vol. 47, No. 2, 2010, pp. 87-97.
Sikdar, Siddhartha et al., "Novel Method for Predicting Dexterous Individual Finger Movements by Imaging Muscle Activity Using a Wearable Ultrasonic System", IEEE Transactions on Neural Systems and Rehabilitation Engineering, vol. 22, No. 1, Jan. 2014, pp. 69-76.
Sueda, Shinjiro et al., "Musculotendon Simulation for Hand Animation", ACM Transactions on Graphics (TOG)—Proceedings of ACM SIGGRAPH 2008, vol. 27 Issue 3, Article No. 83, vol. 27 Issue 3, Aug. 2008, 8 pp. total.
Szabo, Thomas L., "Diagnostic Ultrasound Imaging: Inside Out, Second Edition", Elsevier Inc., 2013, 829 pp. total.
Van Den Branden Lambrecht, Christian J., "A Working Spatio-Temporal Model of the Human Visual System for Image Restoration and Quality Assessment Applications", ICASSP-96, Conference Proceedings of the 1996 IEEE International Conference on Acoustics, Speech, and Signal Processing, May 1996, 4 pp. total.
Watson, Andrew B. et al., "Model of human visual-motion sensing", Journal of the Optical Society of America A, vol. 2, No. 2, Feb. 1985, pp. 322-342.
Watson, Andrew B. et al., "Model of visual contrast gain control and pattern masking", Journal of the Optical Society of America A, vol. 14, No. 9, Sep. 1997, pp. 2379-2391.
Watson, Andrew B., "The search for optimal visual stimuli", Vision Research, vol. 38, 1998, pp. 1619-1621.
Watson, Andrew B., "The Spatial Standard Observer: A Human Visual Model for Display Inspection", Society for Information Display, SID 06 Digest, Jun. 2006, pp. 1312-1315.
Watson, Andrew B., "Visual detection of spatial contrast patterns: Evaluation of five simple models", Optics Express, vol. 6, No. 1, Jan. 3, 2000, pp. 12-33.
Wikipedia, "List of refractive indices", https://en.wikipedia.org/wiki/List_of_refractive_indices, Dec. 7, 2003, 5 pp. total.
Williams III, T. W., "Progress on stabilizing and controlling powered upper-limb prostheses", Journal of Rehabilitation Research & Development, Guest Editorial, vol. 48, No. 6, 2011, pp. ix-xix.
Willis, Karl D. et al., "MotionBeam: A Metaphor for Character Interaction with Handheld Projectors", CHI '11 Proceedings of the SIGCHI Conference on Human Factors in Computing Systems, May 7-12, 2011, pp. 1031-1040.
Yun, Xiaoping et al., "Design, Implementation, and Experimental Results of a Quaternion-Based Kalman Filter for Human Body Motion Tracking", IEEE Transactions on Robotics, vol. 22, No. 6, Dec. 2006, pp. 1216-1227.
Zhang, Cha et al., "Maximum Likelihood Sound Source Localization and Beamforming for Directional Microphone Arrays in Distributed Meetings", IEEE Transactions on Multimedia, vol. 10, No. 3, Apr. 2008, pp. 538-548.

\* cited by examiner

METHODS AND APPARATUS FOR ACTIVE TRANSPARENCY MODULATION

CROSS-REFERENCE TO RELATED APPLICATIONS

This application claims the benefit of U.S. Provisional Patent Application No. 62/332,168, filed May 5, 2016, the entirety of which is incorporated herein by reference.

FIELD

One aspect of the present disclosure generally relates to active transparency modulation of lens elements for near-eye displays, wearable displays, augmented reality displays and virtual reality displays.

BACKGROUND

Numerous deficiencies exist in passive optics and waveguides currently used in near-eye, wearable and projected displays in augmented, mixed and virtual reality applications. Conventional passive optics tend to create see-through or "ghosted" images or objects instead of an impression of solidity and lead to a ghosted effect of the displayed object as perceived by a viewer. Stereoscopy with ghosted objects also creates complicated issues for binocular vision applications.

Conventional transparent lens/display substrates also typically suffer from display quality degradation in the presence of ambient illumination or specular reflection sources in the environment around the user from sources such as sunlight, lamps, headlights or reflections from reflective surfaces.

Current attempts to overcome the above-described ghosting problem have included, for instance, increasing display brightness and/or contrast and reducing the light that is admitted through the viewing lens using a visor element that partially gates the amount of light admitted to the user's eyes. Unfortunately, such prior approaches tend to reduce the "immersiveness" of the display quality and may also increase power consumption. Additionally, such prior approaches are typically application-dependent and necessarily require the use of three distinct, application-specific technologies to meet the different requirements for each of the mixed, augmented or virtual reality systems respectively.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

In the drawings.

DETAILED DESCRIPTION

The present disclosure and various of its embodiments are set forth in the following description of the embodiments which are presented as illustrated examples of the disclosure in the subsequent claims. It is expressly noted that the disclosure as defined by such claims may be broader than the illustrated embodiments described below. The word "exemplary" is used herein to mean serving as an example, instance, or illustration. Any aspect or design described herein as "exemplary" is not necessarily to be construed as preferred or advantageous over other aspects or designs.

According to one aspect of the disclosure herein, a viewing system is provided including an active transparency modulation film comprised of addressable arrays of electrochromic pixel structures and electronics that may be used in a head mounted display (HMD) and a head-up display (HUD). In one embodiment, the active transparency modulation film may be electrically controllable from highly transparent to highly reflective. The active transparency modulation film, pixel structures and supporting processing electronics (e.g., circuitry) provide improved viewing, such as by minimizing the undesirable effects of image ghosting in a viewed scene.

By virtue of the embodiments disclosed herein, it is possible to provide a low-power system solution that can be configured to transition between mixed, augmented, and virtual reality modalities, such that the deficiencies commonly found in conventional augmented reality, mixed reality, and virtual reality wearable devices are addressed. For example, display quality may be improved and ghosting may be reduced by virtue of the embodiments disclosed herein.

Figure 1:
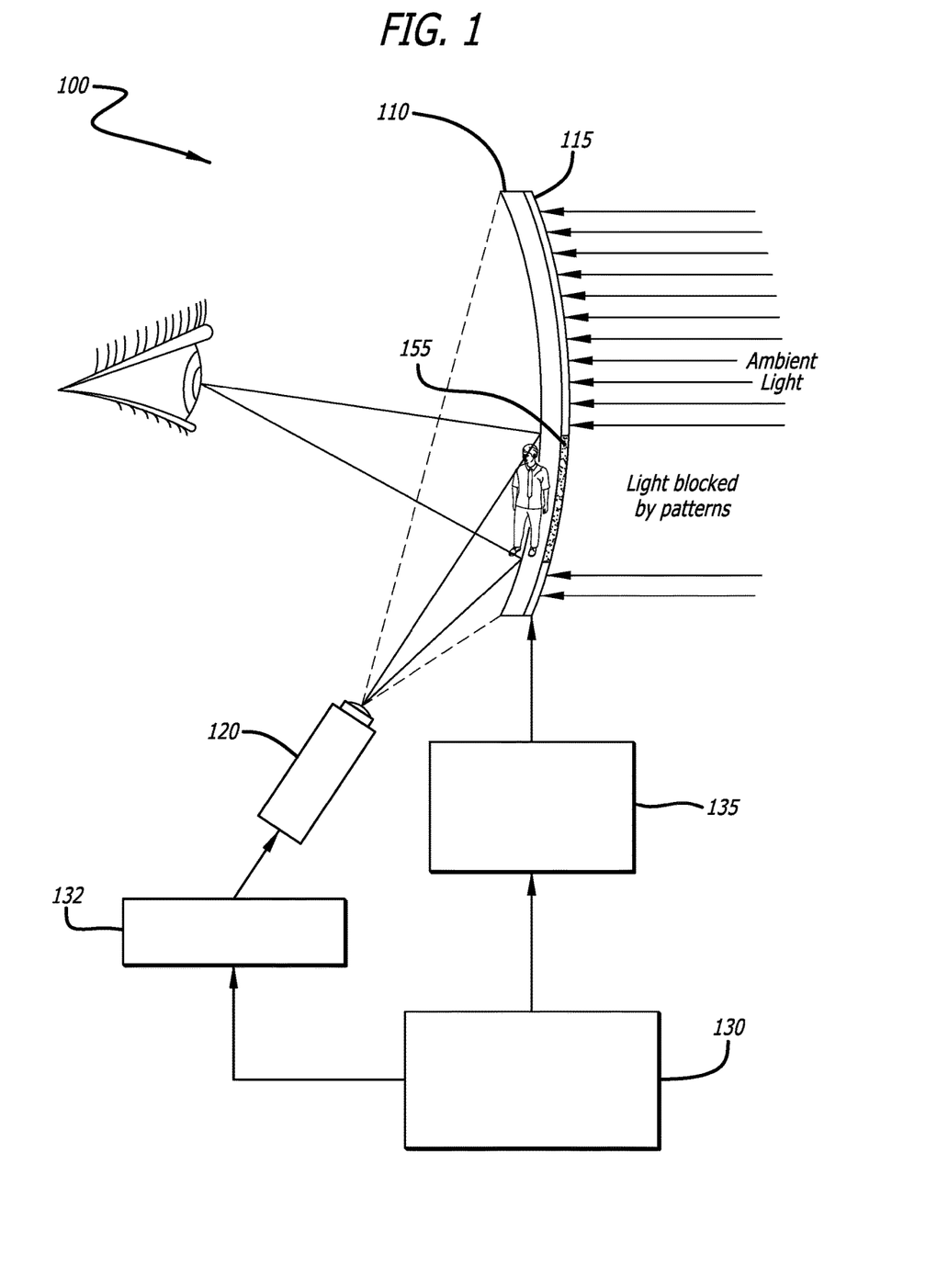
FIG. 1 illustrates a first example for explaining a viewing system for active transparency modulation according to an embodiment.

Turning to the embodiment depicted in FIG. 1, a viewing system 100 may comprise an imaging unit 120 comprising a light engine and an imager to project displayed content (e.g., still or moving images). The viewing system 100 may also comprise a see-through patterned optical lens 110 or one or more waveguide elements operating in cooperation with one or more user-defined refractive or diffractive optical elements and beam-splitting elements that are disposed within thickness of optical lens 110, whereby displayed content from imaging unit 120 is transmitted through the thickness of optical lens 110 and projected toward the pupil of the viewer. Examples of such devices incorporating the above refractive or diffractive optical and beam-splitting elements are disclosed in, for instance, copending U.S. patent application Ser. No. 15/381,459, filed Dec. 16, 2016, entitled "Systems and Methods for Augmented Near-Eye Wearable Displays", and, U.S. patent application Ser. No. 15/294,447, filed Oct. 14, 2016, entitled "Dual-Mode Augmented/Virtual Reality (AR/VR) Near-Eye Wearable Displays", the entirety of each of which is incorporated herein by reference. Lens 110 may be comprised of glass or polymer.

Lens 110 includes an active transparency modulation film 115 comprising an electrochromic pixel layer that is constructed to allow alteration of light transmission properties of film 115 by applying an electrical current or potential. In the embodiment of FIG. 1, film 115 is an electrochromic pixel layer applied to the scene-facing side of lens 110. In other embodiments, film 115 may be applied to either side of the lens 110. In one embodiment, film 115 itself may be a composite of transparent polymer substrates, transparent conductive oxide electrodes, thin film transistor arrays, and electrochromic pixel arrays. In other embodiments, film 115 may be a composite of any combination of: transparent polymer substrates, transparent conductive oxide electrodes, thin film transistor arrays, and electrochromic pixel arrays. In embodiments involving transparent conductive oxide electrodes, film 115 may be in electrical connection through the transparent conductive oxide electrodes to the other components of viewing system 100.

In one embodiment, pixels of the electrochromic pixel layer may be pulse-width modulated ("PWM") in order to actively control transparency modulation of the film 115. In addition, proportional voltage or current modulation can be used for ratiometric control of the admitted ambient light through the electrochromic film layer 115. The translucency of the lens element 110 can thereby be modulated between optically clear and opaque states. Accordingly, viewing system 100 may be switched between augmented or mixed reality modes to a virtual reality mode.

In one embodiment, the pixels of the electrochromic film 115 may have a different spatial resolution than the light engine of the imaging unit 120 used for projected display. For example, the spatial resolution of the pixels of the electrochromic film 115 may be lower than that of the light engine of the imaging unit 120.

In one embodiment, the electrochromic pixel layer (also referred to herein as the electrochromic film) may be comprised of materials such as a tungsten trioxide ("$WO_3$") thin film or a polymer dispersed liquid crystal ("PDLC")-based film laminated on the surface of the optical lens 110. These films are bi-stable and active power is not required to maintain the On or Off state of the film. In other words, for electrochromic film that is electrochromatically bi-stable, once a color change has occurred, the state of film 115 remains even in absence of excitation or pulse modulation.

It is generally known that $WO_3$ does not typically switch well at high frequencies and that $WO_3$ is generally not well-suited for active displays due to its relatively slow switching rate of ~100 msec. On the other hand, PDLC based films can typically be switched at acceptably high rates. While $WO_3$ exhibits relatively slow switching rates, the content rate (i.e., the rate at which content moves across a user's field of view in a near-eye display) is far slower than the display refresh (frame) rate. This distinction between content and display refresh rates allows the use of electrochromic materials that may have slower switching frequencies in the embodiments herein. In some embodiments, the display refresh rate may be controlled by imagers such as the Quantum Photonic Imager or "QPI®" imager (discussed below), DLP, LCoS, OLED or LBS light modulation engines.

Thus, the electrochromic content refresh rate is typically slower than the display refresh rate. In one embodiment, a display refresh rate may be approximately ~60 Hz or greater and a content refresh may be approximately ~10 Hz or greater, thus making it possible to switch $WO_3$ mode well within the content refresh rate.

In one embodiment, the imager of the imaging unit 120 is capable of filling the field of view of the range of the possible positions of a projected image, and only uses a portion of the projection capability (e.g., a subset of pixels) for smaller images within that field of view. In one embodiment, the imager moves or actuates to cover the range of the possible positions of a projected image with respect to the see-through optical lens or waveguide element.

With respect to imagers, a new class of emissive micro-scale pixel array imager devices has been introduced as disclosed in U.S. Pat. No. 7,623,560, U.S. Pat. No. 7,767,479, U.S. Pat. No. 7,829,902, U.S. Pat. No. 8,049,231, U.S. Pat. No. 8,243,770, and U.S. Pat. No. 8,567,960, the contents of each of which is fully incorporated herein by reference. The disclosed light emitting structures and devices referred to herein may be based on the Quantum Photonic Imager or "QPI®" imager. QPI® is a registered trademark of Ostendo Technologies, Inc. These disclosed devices desirably feature high brightness, very fast multi-color light intensity and spatial modulation capabilities, all in a very small single device size that includes all necessary image processing drive circuitry. The solid-state light-(SSL) emitting pixels of the disclosed devices may be either a light emitting diode (LED) or laser emitting diode (LD), or both, whose on-off state is controlled by drive circuitry contained within a CMOS chip (or device) upon which the emissive micro-scale pixel array of the imager is bonded and electronically coupled. The size of the pixels comprising the disclosed emissive arrays of such imager devices is typically in the range of approximately 5-20 microns with a typical emissive surface area being in the range of approximately 15-150 square millimeters. The pixels within the above emissive micro-scale pixel array devices are individually addressable spatially, chromatically and temporally, typically through the drive circuitry of its CMOS chip. The brightness of the light generated by such imager devices can reach multiple 100,000 cd/m2 at reasonably low power consumption.

The QPI imager is well-suited for use in the imagers described herein. See U.S. Pat. No. 7,623,560, U.S. Pat. No. 7,767,479, U.S. Pat. No. 7,829,902, U.S. Pat. No. 8,049,231, U.S. Pat. No. 8,243,770, and U.S. Pat. No. 8,567,960. However, it is to be understood that the QPI imagers are merely examples of the types of devices that may be used in the present disclosure, which devices may, by way of a non-limiting set of examples, include OLED, LED, micro-LED imaging devices. Thus, in the disclosure herein, references to the QPI imager, display, display device or imager are to be understood to be for purposes of specificity in the embodiments disclosed, and not for any limitation of the present disclosure.

Returning to the embodiment of FIG. 1, video coprocessor 132 extracts at least one rendered content outline (e.g., boundary of the content to be displayed) from a video random access memory (VRAM) of graphics processing unit (GPU) 130 which contains "k buffer" information. Generally, a k buffer algorithm is a GPU-based fragment-level sorting algorithm for rendering transparent surfaces. The extracted outline is provided to film layer control coprocesser 135 which then activates the pixels of the electrochromic film 115 to block light at only the pixels 155 that are contained inside the extracted outline. Imaging unit 120 projects the image content onto film 115 in accordance with the pixels inside the extracted outline.

In this context, blocking refers to reflecting or absorbing light incident on pixels of the electrochromic film 115 that are controlled by the electrochromic layer control coprocessor 135 to reflect or absorb only light incident at the pixels 155 that are contained inside the extracted outline, resulting at least some of the incident light being blocked by the patterns), such that a portion of the film 115 is opaque to some degree (e.g., the portion containing pixels 155). In one embodiment, the blocking may be controlled to range from substantially no blocking to substantially full blocking. Such control may be achieved by proportional excitation of at least a portion of electrochromic film 115, or by pulse modulation of at least a portion of electrochromic film 115, or by pulse modulation of at least the portion of the electrochromic film that is at least partially electrochromically bistable, as discussed above.

In one embodiment, the intensity of the modulation of the electrochromic pixel layer 115 (e.g., degree or level of transparency) may further be controlled based upon the ambient illumination of the environment of the user.

In one embodiment, one or more of the processors of viewing system 100 (e.g., GPU 130, video coprocessor 132, electrochromic layer control coprocessor 135) may also be connected to a memory block that can be implemented via one or more memory devices including volatile storage (or memory) devices such as random access memory (RAM), dynamic RAM (DRAM), synchronous DRAM (SDRAM), static RAM (SRAM), or other types of storage devices. The one or more of the processors may be implemented in software, hardware, or a combination thereof. For example, the one or more of the processors can be implemented as software installed and stored in a persistent storage device, which can be loaded and executed in a memory by the processor to carry out the processes or operations described throughout this application. The one or more of the processors may each represent a single processor or multiple processors with a single processor core or multiple processor cores included therein. The one or more of the processors may each represent a microprocessor, a central processing unit (CPU), graphic processing unit (GPU), or the like. The one or more of the processors may each be a complex instruction set computing (CISC) microprocessor, reduced instruction set computing (RISC) microprocessor, matched instruction set microprocessor (MISP), very long instruction word (VLIW) microprocessor, or processor implementing other instruction sets, or processors implementing a combination of instruction sets. The one or more of the processors can also be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. The one or more of the processors may each be a cellular or baseband processor, a network processor, a graphics processor, a communications processor, a cryptographic processor, an embedded processor, or any other type of logic capable of processing instructions. Furthermore, the one or more of the processors can be implemented as specific hardware logic in a processor or processor core as part of an instruction set accessible by a software component via one or more specific instructions.

Figure 2:
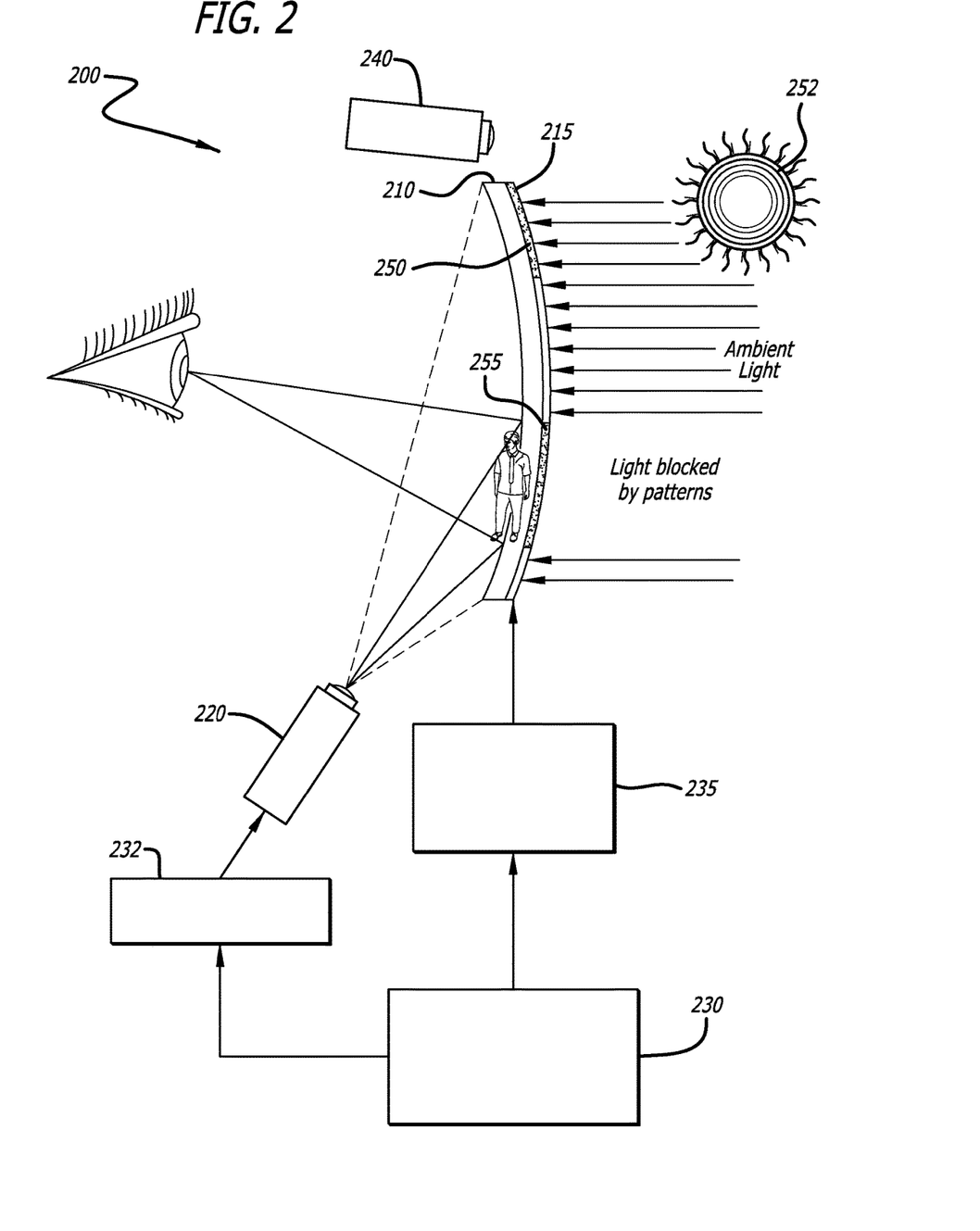
FIG. 2 illustrates a second example for explaining a viewing system for active transparency modulation according to an embodiment.

Turning to the embodiment of FIG. 2, similar to the embodiment of FIG. 1, viewing system 200 includes lens 210 (e.g., glass or polymer see-through patterned optics similar to lens 110), film 215 (e.g., similar to film 115), electrochromic layer control coprocessor 235 (e.g., similar to electrochromic layer control coprocessor 135), GPU 230 (e.g., similar to GPU 130), video coprocessor 232 (e.g., similar to video coprocessor 132), and an imaging unit 220 (e.g., similar to imaging unit 120). Also similar to FIG. 1, video coprocessor 232 determines an outline of content to be displayed and the outline is provided to electrochromic layer control coprocessor 235 which then activates the pixels of the electrochromic film 215 to block light incident at pixels 255 that are inside the image outline, resulting in at least some of the incident light being reflected or absorbed by the pattern. Similar to FIG. 1, pixels of the film layer 215 may be actively controlled by proportional excitation of at least a portion of electrochromic film 215, or by pulse modulation of at least a portion of electrochromic film 215, or by pulse modulation of at least the portion of the electrochromic film that is at least partially electrochromically bistable.

In the embodiment of FIG. 2, viewing system 200 includes one or more environment (or ambient scene) monitoring cameras 240 that may obtain data used to generate image outlines by scanning for a high-intensity point or diffuse light sources (e.g., 252). In this embodiment, video coprocessor 232 segments the high-intensity point or diffuse light sources 252 from the scene, calculates their relative spatial distributions, and localizes the locations of the light sources 252. Video coprocessor 232 then calculates the location of the light sources 252 relative to the user's eyes with respect to the displayed image projected by imaging unit 220. This process may be automated and configured to run alongside display of the image, or may be turned on manually.

In one embodiment, the intensity of the modulation of the electrochromic pixel layer 215 may be controlled based upon the ambient illumination of the environment of the user, and/or any other data obtained from the one or more environment monitoring cameras 240 (e.g., the location of the light sources 252 relative to the user's eyes). For example, as shown in the embodiment of FIG. 2, the transparency of pixels 250, which comprise a portion of electrochromic film 215, have been controlled so as to reduce transmittance of light from light source 252 based at least in part on the determined location of light source 252. The degree of modulation may be given a predetermined transmissivity, such as 40%. The degree of modulation may also vary based on an intensity and location of a light source (e.g., 252).

In the embodiment of FIG. 2, the displayed image may be content for augmented reality (AR) or mixed reality (MR). The content is generated programmatically (under program control, not simple video), and therefore in one embodiment, the image outline may be calculated predictively to reduce the number of calculations required.

Figure 3:
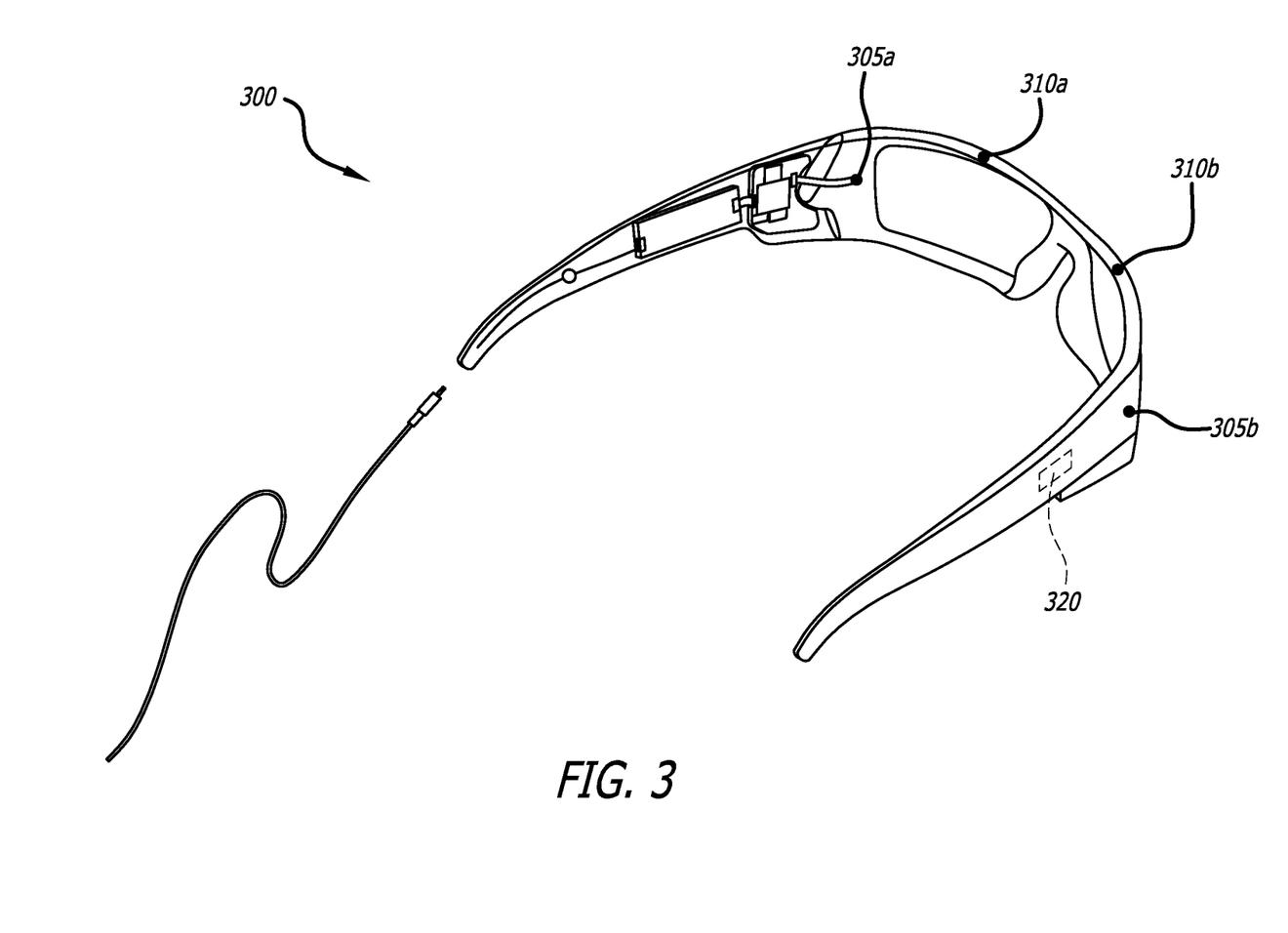
FIG. 3 illustrates an example for explaining a wearable near-eye display according to an embodiment.

FIG. 3 illustrates an exemplar near-eye wearable display 300 according to an alternate embodiment. In one embodiment, wearable display 300 comprises see-through optical glasses. As shown in FIG. 3, a wearable display 300 may include ambient light sensors 305a and 305b, eye tracking sensors 310a and 310b, and head position sensor 320. Although the embodiment of FIG. 3 shows two ambient light sensors, two eye tracking sensors, and one head position sensor 320, any suitable number of these sensors may be used in other embodiments.

With respect to ambient light sensors 305a and 305b, these sensors may be similar to environment monitoring cameras 240 and may provide information for wearable display 300 to determine a high-intensity point or diffuse light sources (e.g., 252). In one embodiment, ambient light sensors 305a and 305b are configured to sense only ambient light having a predetermined intensity. The predetermined intensity may be set such that the ambient light sensors 305a and 305b sense sun light. The predetermined intensity may also be set to a user-defined brightness.

With respect to eye tracking sensors 310a and 310b and head position sensor 320, these sensors provide both eye and head tracking capabilities and may be able to obtain information regarding a viewer's eye gaze direction, interpupillary distance (IPD) and head orientation. For example, the optical see-through glasses 300 may comprise at least one eye-tracking sensor per eye (e.g., 310a, 310b) to detect multiple parameters of the viewer's eyes including but not limited to the angular position (or look angle) of each eye, the iris diameter, and the distance between the two pupils (IPD). As one example, the eye-tracking sensors 310a, 310b may be a pair of miniature cameras each positioned to image one eye. In one embodiment, the eye-tracking sensors 310a, 310b may be placed in a non-obstructive position relative the eyes' field of view (FOV) such as shown in FIG. 3. In addition, the eye-tracking sensors 310a, 310b may be placed on the bridge section of the frame of the glasses. The eye tracking components 310a, 310b and the head tracking component 320 may be configured to detect, track and predict where the viewer's head is positioned and where the viewer is focused in depth and direction.

Wearable display 300 may also include or be in communication with components similar to those illustrated in FIGS. 1 and 2, such as a lens (e.g., glass or polymer see-through patterned optics similar to lens 110 or 210), a film (e.g., similar to film 115 or 215), a electrochromic layer control coprocessor (e.g., similar to electrochromic layer control coprocessor 135 or 235), a GPU (e.g., similar to GPU 130 or 230), a video coprocessor (e.g., similar to video coprocessor 132 or 232), and an imaging unit (e.g., similar to imaging unit 120 or 220).

The components of wearable display 300 may be interconnected together via a wireless local area network (W-LAN) or wireless personal area network (W-PAN) and may also be connected to the internet to enable streaming of image content to be displayed.

In one embodiment, the active transparency modulation film may be controlled by depth information received and calculated from head and eye tracking sensors (320, 310a, 310b), where the wearable display 300 is part of an augmented or mixed reality (AR or MR) system. In this embodiment, the interpupillary distance (IPD) of the viewer's eyes that is detected by the eye tracking sensors (310a, 310b) is used to calculate the depth of the object of interest that the viewer is focused on. The boundaries of the object of interest are then calculated and used to control the transparency of the film.

Accordingly, components of wearable display 300 (e.g., computation processing elements) may be configured such that the outline of the content is used to create predetermined regions on the lens of the see-through optics wearable display 300 that appear less transparent to the viewer. In this manner, fewer lumens are required to convey solidity and image brightness, and an amount of required power is reduced. Such capabilities are particularly advantageous for application in automotive head-up-display (HUD) technologies and provide greatly improved contrast in high-ambient brightness environments. In addition, the components of wearable display 300 may be configured such that the light engine and the display (imager) only projects light to the appropriate regions with the afore-described reduced transparency to enhance the 'solidness' of the AR object using the active transparency modulation film of the lens. It is therefore possible to alleviate the problem of "ghosted" images as is often found in conventional AR devices.

With respect to wearable displays, U.S. patent application Ser. No. 15/294,447 filed Oct. 14, 2016, U.S. patent application Ser. No. 15/381,459 filed Dec. 16, 2016, U.S. patent application Ser. No. 15/391,583 filed Dec. 27, 2016, U.S. patent application Ser. No. 15/477,712 filed Apr. 3, 2017, and U.S. patent application Ser. No. 15/499,603 filed Apr. 27, 2017, the contents of each of which are incorporated herein by reference, discuss various wearable displays suitable for use in the embodiments disclosed herein.

Figure 4:
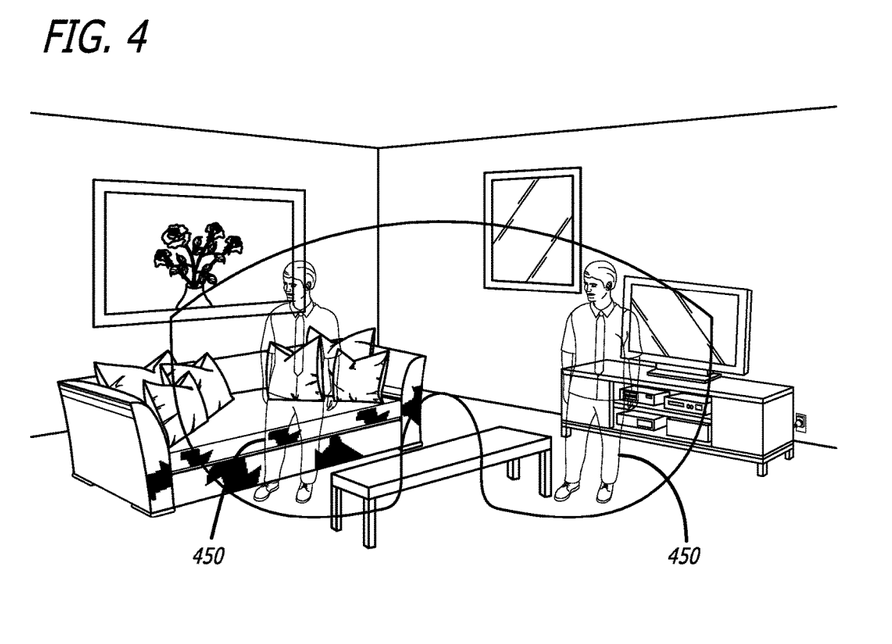
FIG. 4 illustrates a view for explaining a "ghosted" translucent image of a predetermined augmented reality image (e.g., a person) as viewed through a pair of conventional augmented reality near-eye glasses.

FIG. 4 illustrates one example for explaining a ghosted image 450. As shown in FIG. 4, ghosted image 450 is perceived by a viewer to be a see-through image in which elements of the background scene may be viewed through the ghosted image 450.

Figure 5:
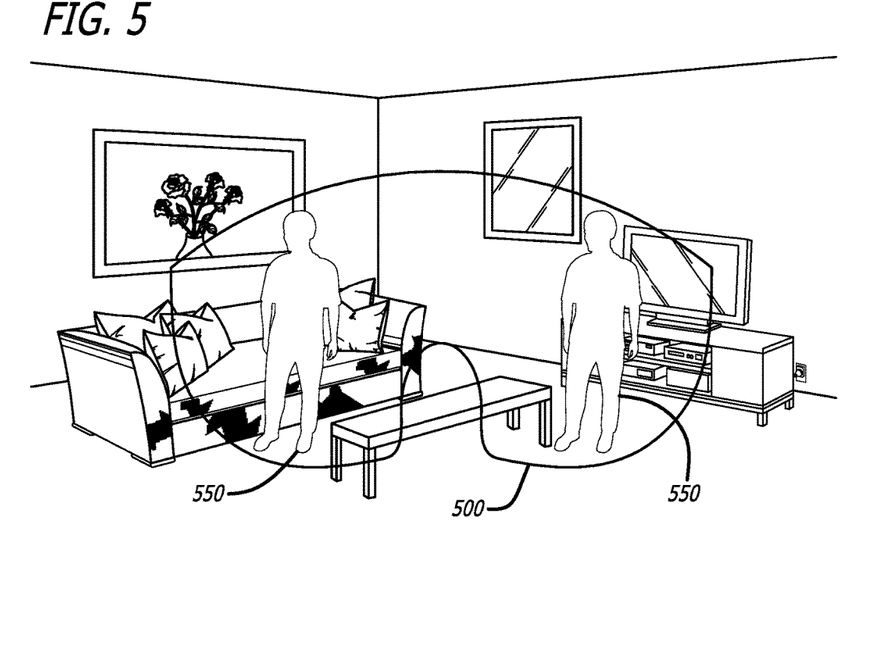
FIG. 5 illustrates a view for explaining an opaque silhouetted augmented reality image (e.g., a person) selectively formed on an active transparency modulation film as viewed through a pair of augmented reality near-eye glasses incorporating an active transparency modulation film according to an embodiment.

Turning to FIG. 5, a silhouetted image 550 (illustrated in FIG. 5 as silhouette of a person) may be an augmented reality image for which the outline (silhouette) of the image is defined but other details of the image are not defined. In particular, augmented reality near-eye glasses 500 may include components similar to those of viewing system 100, 200 or wearable display 300 including lenses having an active transparency modulation film (e.g., film 115, 215). The silhouetted image 550 may be selectively defined on the active transparency modulation film as viewed through the pair of augmented reality near-eye glasses 500.

The image projected in the embodiment of FIG. 5 may be a still image or a moving image. In the case of a still image, it may still be considered that the still image will move relative to the see-through optical lens or waveguide element with the viewer's head movement (which may be sensed by one or more head tracking sensors as shown in FIG. 3).

It should also be noted that in any of the embodiments described herein, an image may be a black and white image or a color image.

Figure 6:
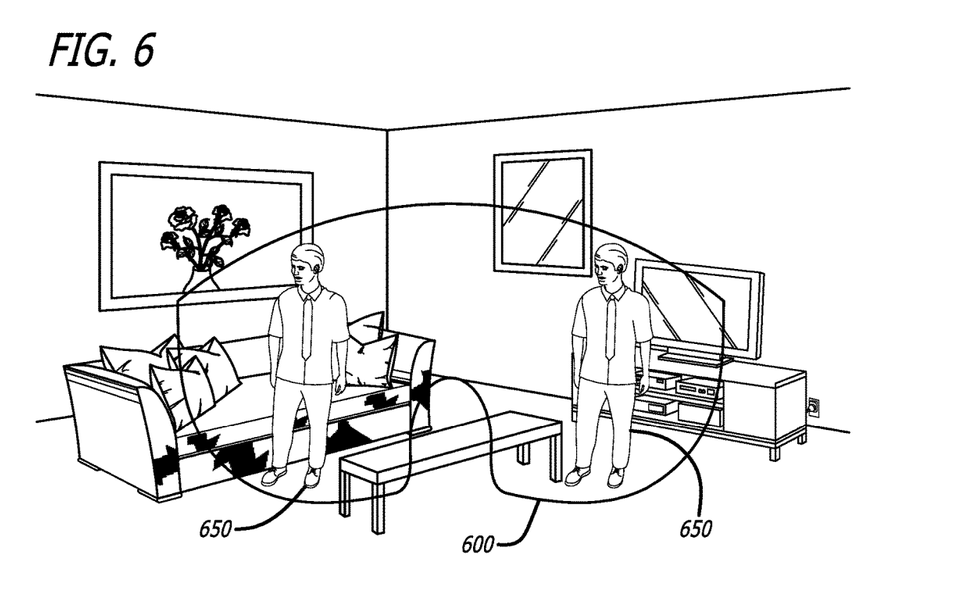
FIG. 6 illustrates a view for explaining an ""unghosted"" augmented reality image (e.g., a person) projected upon and superimposed over an opaque silhouetted image such as the opaque silhouetted augmented reality image of FIG. 5 according to an embodiment.

FIG. 6 illustrates an example for explaining an ""unghosted"" image 650 (illustrated in FIG. 6 as a person) comprising an augmented reality image projected upon and superimposed over an opaque silhouetted image, such as silhouetted image 550 of FIG. 5, as viewed through a pair of augmented reality near-eye glasses 600. Augmented reality near-eye glasses 500 may include components similar to those of viewing system 100, 200 or wearable display 300 including lenses having an active transparency modulation film (e.g., film 115, 215). Augmented reality wearable display 600 may allow a viewer to view unghosted image 650 as well as the real world. As shown in FIG. 6, unghosted image 650 includes details in addition to the outline of the image, and the impression of solidity for unghosted image 650 is also increased, especially as compared to ghosted image 450.

Figure 7:
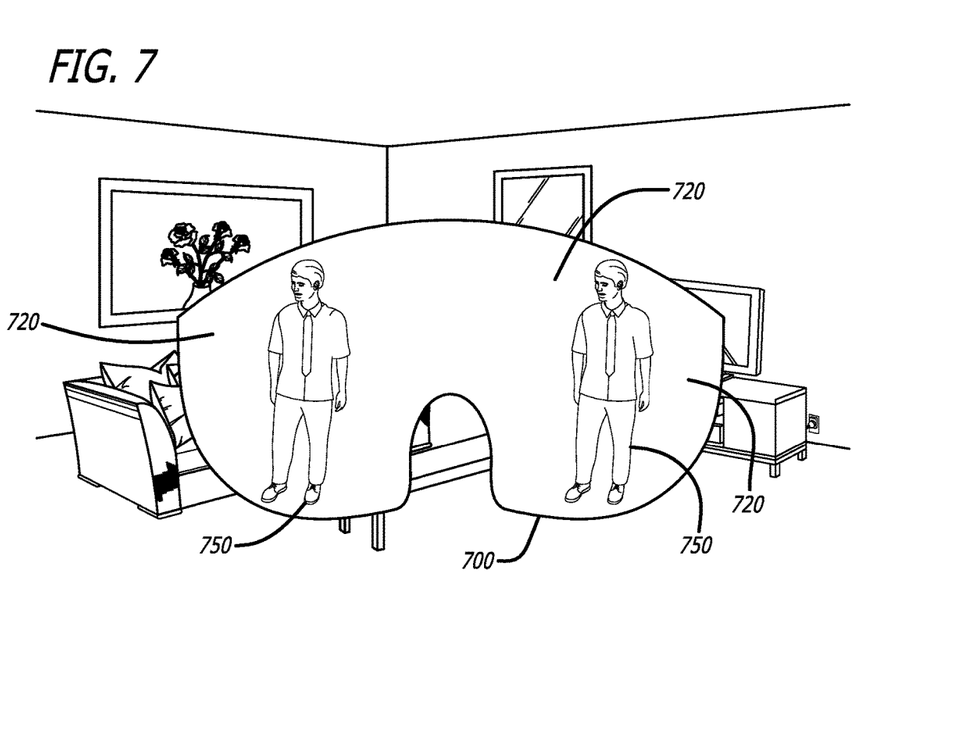
FIG. 7 illustrates a view for explaining a virtual reality image (e.g., a person) projected upon an opaque viewing area of an active transparency modulation film as viewed in a pair of virtual-reality near-eye glasses according to an embodiment.

FIG. 7 illustrates an example for explaining an unghosted image 750 (illustrated in FIG. 7 as a person) comprising a virtual reality image projected upon the entire viewing area 720 of an active transparency/reflectance film of a lens, the viewing area 720 being opaque such that a viewer may not view the real word, as viewed through a pair of virtual reality near-eye glasses 700. The near-eye glasses 700 may include components other than the lens and film, similar to those of viewing system 100, 200 or wearable display 300.

Figure 8:
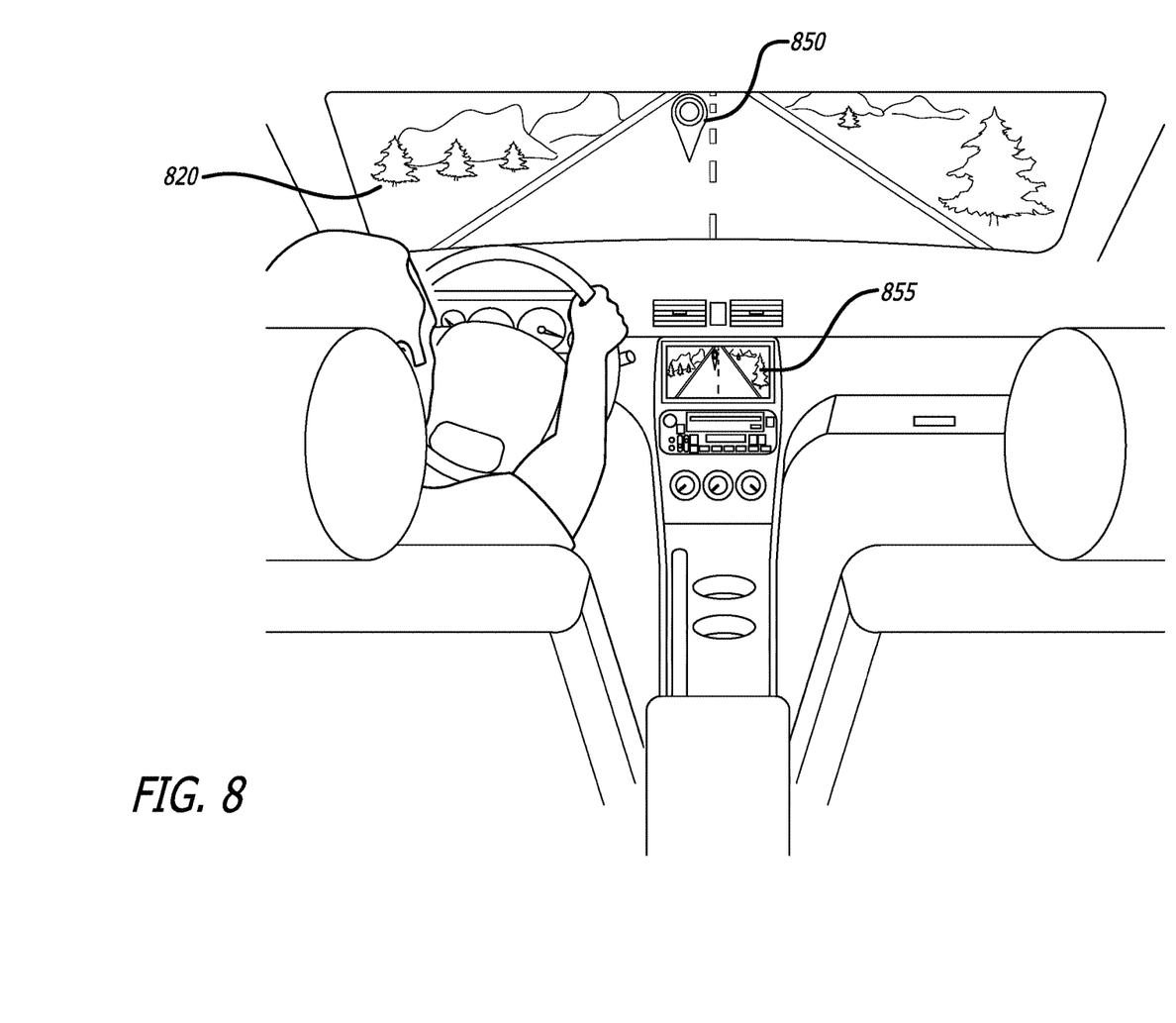
FIG. 8 illustrates a view for explaining an automobile heads-up display (HUD) incorporating an active transparency modulation film in which a displayed image is projected upon and superimposed over a predetermined opaque region of the HUD according to an embodiment.

FIG. 8 illustrates an example for explaining a viewing system including an active transparency modulation film used to control the viewability of an automotive head-up display (HUD) according to one embodiment. In this embodiment, the active transparency modulation film is applied to the inside of the automobile windshield 820 to display an augmented reality image 850. In addition the HUD may display content 855 on a display screen, or may alternatively present content 855 as augmented reality content.

By virtue of incorporating the active transparency modulation film, it is possible to avoid ghosting of the information presented by the HUD, and to reduce the illumination perceived by the driver from particularly bright spots, both of which make the information presented by the HUD more readable without obstructing the driver's vision of the road ahead, and improving the driver's vision of the road ahead.

Turning to FIGS. 9A-9E, an active transparency modulation film may be incorporated into transparent display cases (e.g., 900a) holding objects (e.g., 910a), thereby creating enclosures that allow a change of appearance of the objects contained inside the display cases. In FIGS. 9A-9E, each of the display cases 900a-E include an active transparency modulation film that may be comprised of PDLC.

Figure 9A:
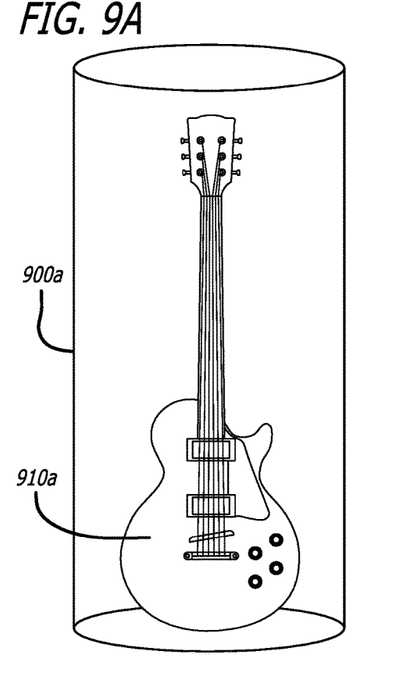
FIGS. 9A-9E illustrate examples for explaining selective object masking and projected object textures superimposed on physical objects according to an embodiment.
Figure 9B:
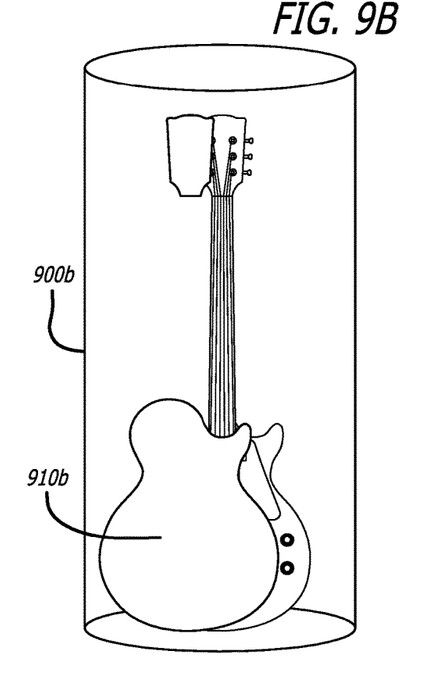
Figure 9C:
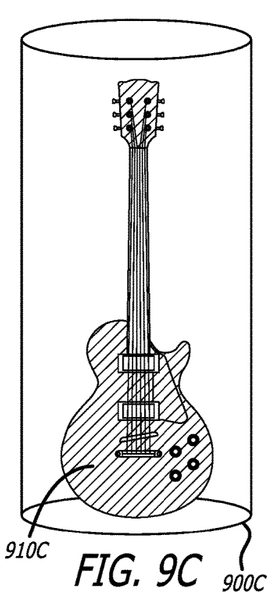
Figure 9D:
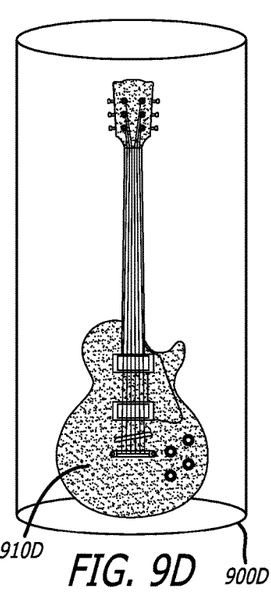
Figure 9E:
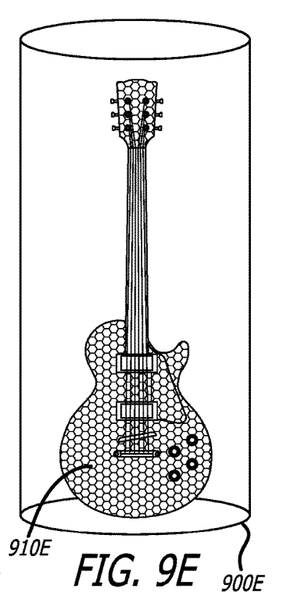

Thus, as shown in FIG. 9A, a transparent display 900a displays object 910a. In one embodiment, display 900a may be cylindrical. In FIG. 9B, the active transparency modulation film on the display 900b is controlled to create mask 910b for the object, whereby the mask defines pixels for which light is blocked and the object appears opaque. In FIGS. 9C-9E, for displays 900c, 900d, 900e, different light textures are projected onto the masked object of FIG. 9B. The light textures are projected by imaging devices or projectors (not shown) to create different skins 910C, 910D, 910E for the objects.

Figure 11:
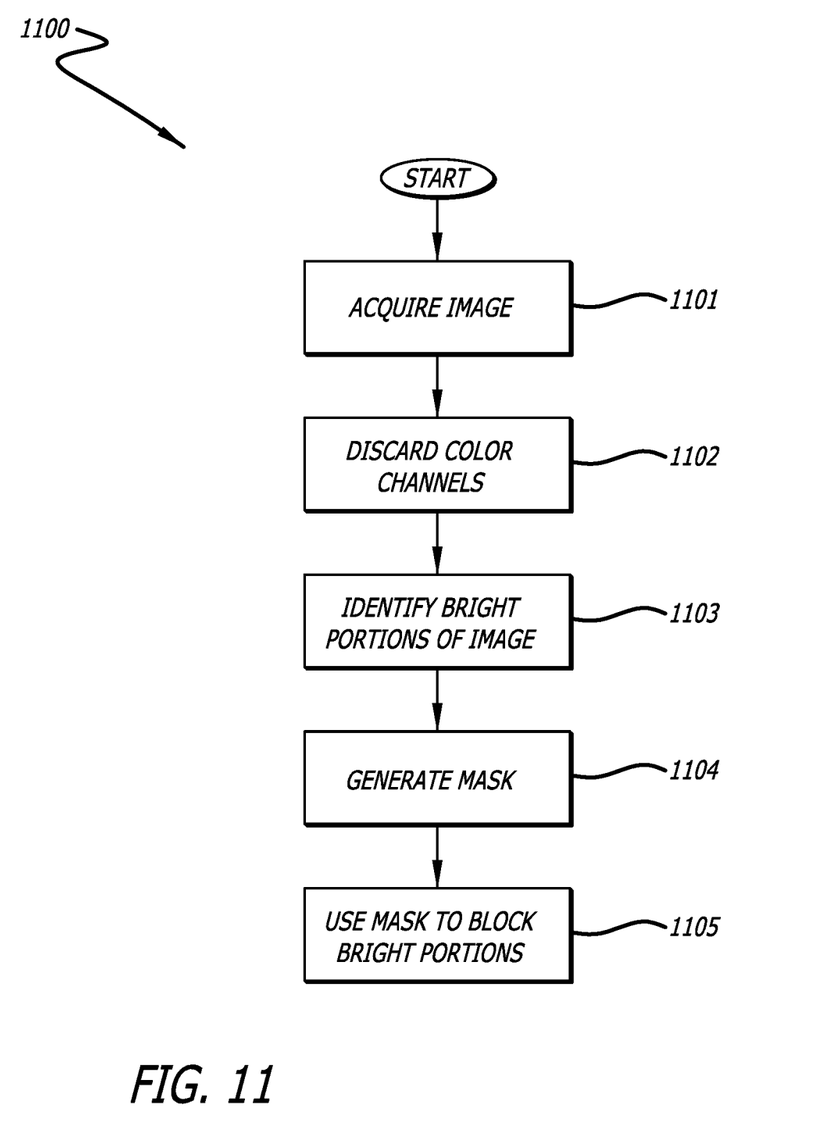
FIG. 11 illustrates a flow diagram for explaining an example method for active transparency modulation according to an embodiment herein.

FIG. 11 illustrates a flow diagram for explaining an example method for active transparency modulation according to an embodiment herein, and particularly how bright areas may be masked in a lens incorporating an active transparency modulation film. It should be understood that in embodiments involving a mask, masked areas may be given a predetermined transmissivity, such as 40%.

In this regard, the following embodiments may be described as a process 1100, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process corresponds to a method, procedure, etc.

In some embodiments discussed herein, GPU depth buffers are used for direct control of an active transparency modulation film. However, in situations where GPU depth buffer data is unavailable, process 1100 may be used to calculate an outline of content to be displayed.

At block 1101, the image content to be displayed is loaded in a memory, such as SRAM, accessible by one or more processors (e.g., GPU, video coprocessor, electrochromic layer control coprocessor). In addition, the mask image containing the states of the pixels of the active transparency modulation layer is first initialized at zero (e.g., the 'off' position). At block 1102, color channels are discarded. For example, the image may be transformed into a binary, black and white image based on entropy, cluster and statistical analysis. At block 1103, the application processor then separates the bright field (e.g., foreground) component of the image from the dark field component (e.g., background, which is black in one embodiment). In other embodiments, the order of execution of blocks 1102 and 1103 is switched, such that the bright field component of the image is first separated from the dark field component and then the bright field component is transformed into a binary, black and white image based on entropy, cluster and statistical analysis. The morphology of the black and white images is then analyzed to detect separated or disconnected objects in the image. Pixels of the active transparency modulation film associated with each separated object are then grouped and labeled. At block 1104, each individual pixel group may then be used to calculate the alpha value associated with that group and the pixels that represent a convex hull of the group. After these parameters are calculated, the corresponding pixels on the active transparency modulation film are modulated accordingly by the electrochromic layer control coprocessor at block 1105.

Figures 10A, 10B, 10C, 10D:
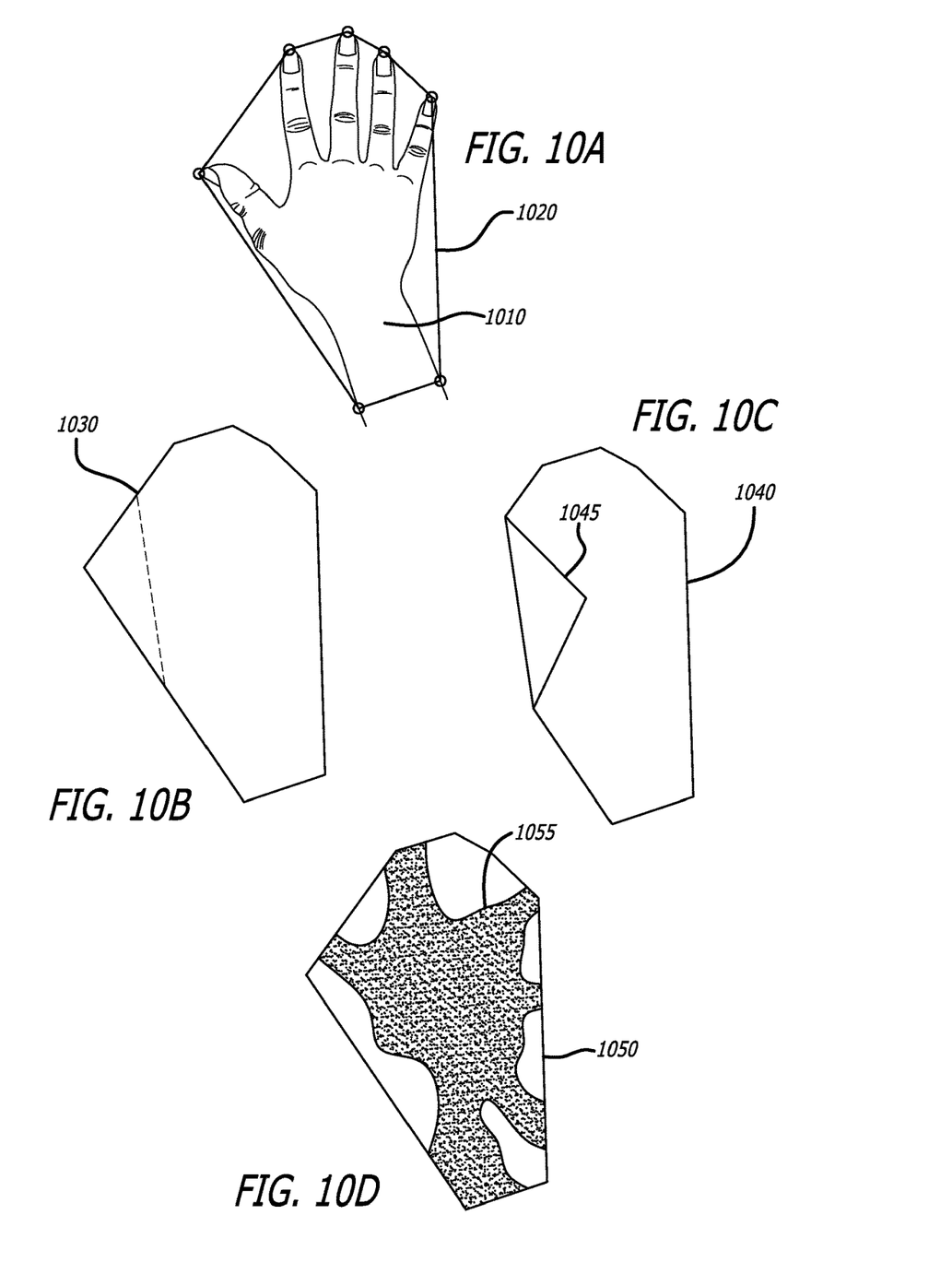
FIGS. 10A-10D illustrate examples for explaining convex hulls according to an embodiment.

With respect to convex hulls, generally, a convex hull or convex envelope may be considered a set of all convex combinations of points in a set of points. The convex hull may be generated from a set of edges in an image. For example, only the outlying pixels of desired opaque areas may be determined, and the opaque silhouetted image is taken as a convex hull of the image. When the set of points is a bounded subset of a Euclidean plane, the convex hull may be visualized as the shape enclosed by a rubber band stretched around the set of points. Examples of convex hulls are illustrated in FIGS. 10A-D. In particular, object 1010 has convex hull 1020 in FIG. 10A. In FIG. 10B, the outlying points of the object and the convex hull have the same silhouette (outline) 1030. In the FIG. 10C, one corner of the object from FIG. 10B has been folded along the dashed line, and therefore object 1045 has convex hull 1040. In FIG. 10D, object 1055 has convex hull 1050.

Although the embodiments of FIGS. 10 and 11 specifically rely on convex hulls to segment an image and calculate an image outline, in other embodiments, any image segmentation technique may be used. In this regard, convex hull based segmentation may be considered one example of an image segmentation technique. Other examples may include thresholding, clustering, and using statistical properties of display bitmap pixels. Edge detection algorithms may also be used to calculate the image outline or boundary. As discussed herein, the outline generated by the image segmentation technique allows the system to "blank out" the silhouette of the displayed image (e.g., as illustrated in FIG. 5).

Thus, the present disclosure has a number of aspects, which aspects may be practiced alone or in various combinations or sub-combinations, as desired. While certain preferred embodiments have been disclosed and described herein for purposes of illustration and not for purposes of limitation, it will be understood by those skilled in the art that various changes in form and detail may be made therein without departing from the spirit and scope of the disclosure. Therefore, it must be understood that the illustrated embodiments have been set forth only for the purposes of example and should not be taken as limiting the disclosure as defined by any claims in any subsequent application claiming priority to this application.

For example, notwithstanding the fact that the elements of such a claim may be set forth in a certain combination, it must be expressly understood that the disclosure includes other combinations of fewer, more or different elements. Therefore, although elements may be described above as acting in certain combinations and even subsequently claimed as such, it is to be expressly understood that one or more elements from a claimed combination can in some cases be excised from the combination and that such claimed combination may be directed to a subcombination or variation of a subcombination.

The words used in this specification to describe the disclosure and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a subsequent claim must be understood as being generic to all possible meanings supported by the specification and by the word itself.

The definitions of the words or elements of any claims in any subsequent application claiming priority to this application should be, therefore, defined to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements in such claims below or that a single element may be substituted for two or more elements in such a claim.

What is claimed is:

1. A method of minimizing the undesirable effects of image ghosting in a viewed scene of a viewing system, the method comprising:
   providing a see-through optical lens or waveguide element with an active transparency modulation film comprising an electrochromatic pixel layer applied to one side of the see-through optical lens or waveguide element, each pixel being electrically controllable by a processor to be transparent in a first state and to be opaque in a second state, and variable between the first state and the second state by proportional voltage or pulse width modulation;
   defining, by control of selected pixels of the electrochromatic pixel layer, an area of lesser transparency to a viewer on the see-through optical lens or waveguide element; and
   projecting an image onto the area of lesser transparency from the viewing side of the see-through optical lens or waveguide element;
   whereby the image is superimposed onto the area of lesser transparency.

2. The method of claim 1 further comprising controlling which pixels are selected to determine the position of the area of lesser transparency of the see-through optical lens or waveguide element and controlling the position of the projected image on the see-through optical lens or waveguide element to keep the projected image superimposed on the area of lesser transparency as the projected image moves relative to the see-through optical lens or waveguide element.

3. The method of claim 1 wherein the image is generated under program control.

4. The method of claim 1 wherein a degree of transparency of the area of lesser transparency is based on an ambient illumination of the viewer's environment.

5. The method of claim 1 wherein defining the area of lesser transparency comprises determining a boundary of the image using an image segmentation process.

6. The method of claim 5 wherein the image segmentation process is a convex hull algorithm.

7. The method of claim 1 further comprising scanning for a light source and determining a location of the light source, wherein defining the area of lesser transparency is based on the location of the light source.

8. The method of claim 1 further comprising obtaining information regarding the viewer's eye gaze direction, inter-pupillary distance and head orientation to calculate a depth of the viewer's focus.

9. A non-transitory machine-readable medium having instructions stored thereon, which when executed by a processor cause the processor to perform the following method of minimizing the undesirable effects of image ghosting in a viewed scene of a viewing system, the method comprising:
   providing a see-through optical lens or waveguide element with an active transparency modulation film comprising an electrochromatic pixel layer applied to one side of the see-through optical lens or waveguide element, each pixel being electrically controllable by a processor to be transparent in a first state and to be opaque in a second state, and variable between the first state and the second state by proportional voltage or pulse width modulation;
   defining, by control of selected pixels of the electrochromatic pixel layer, an area of lesser transparency to a viewer on the see-through optical lens or waveguide element; and
   projecting an image onto the area of lesser transparency from the viewing side of the see-through optical lens or waveguide element;
   whereby the image is superimposed onto the area of lesser transparency.

* * * * *